US011153554B2

(12) United States Patent
Firmin et al.

(10) Patent No.: US 11,153,554 B2
(45) Date of Patent: Oct. 19, 2021

(54) MULTI-CAMERA SYSTEM FOR MULTIDIMENSIONAL SWIMMING VIDEO CAPTURE

(71) Applicant: Ocula Corporation, Kensington, CA (US)

(72) Inventors: Robert L Firmin, Kensington, CA (US); Allen Scott Weik, Pacifica, CA (US)

(73) Assignee: Ocula Corporation, Kensington, CA (US)

( * ) Notice: Subject to any disclaimer, the term of this patent is extended or adjusted under 35 U.S.C. 154(b) by 0 days.

(21) Appl. No.: 17/189,507

(22) Filed: Mar. 2, 2021

(65) Prior Publication Data

US 2021/0185300 A1 Jun. 17, 2021

Related U.S. Application Data

(63) Continuation-in-part of application No. PCT/US2019/049144, filed on Aug. 30, 2019.
(Continued)

(51) Int. Cl.
*H04N 13/296* (2018.01)
*G03B 17/56* (2021.01)
(Continued)

(52) U.S. Cl.
CPC ......... *H04N 13/296* (2018.05); *G03B 17/561* (2013.01); *H04N 13/239* (2018.05); *H04N 13/254* (2018.05)

(58) Field of Classification Search
CPC .. H04N 13/296; H04N 13/239; H04N 13/254; G03B 17/561
(Continued)

(56) References Cited

U.S. PATENT DOCUMENTS 7,120,524 B2 * 10/2006 Srack .................. G01B 5/0025
702/152
8,827,575 B1 9/2014 Caldeira
(Continued)

FOREIGN PATENT DOCUMENTS

EP 1647514 A1 4/2006
GB 2537174 A 10/2016
(Continued)

OTHER PUBLICATIONS

International Search Report issued in International Application No. PCT/US19/049144 dated Nov. 2, 2019.
(Continued)

*Primary Examiner* — Susan E. Hodges
(74) *Attorney, Agent, or Firm* — United IP Counselors, LLC

(57) ABSTRACT

A multi-camera system for multidimensional video capture is particularly useful for recording the movements of swimmers. The system includes a self-propelled mobile frame that is of sufficient size to surround a swimmer while he or she swims. The frame carries a number of equipment pods. Each equipment pod houses cameras, typically a pair of stereocameras, and may house additional sensors as well. Propulsion pods connect the frame to a pair of tracks, one of which is on each side of the frame, and propel the frame along the tracks. The frame may also support one or more booms that carry equipment pods with cameras and allow the system to capture video from additional angles. The frame carries transmission hardware allowing it to communicate video and other data to external receivers and communication devices in real time or near real time, and to receive data from external devices.

21 Claims, 9 Drawing Sheets

Related U.S. Application Data

(60) Provisional application No. 62/726,409, filed on Sep. 3, 2018.

(51) Int. Cl.
  *H04N 13/239* (2018.01)
  *H04N 13/254* (2018.01)

(58) Field of Classification Search
  USPC .......................................................... 348/47
  See application file for complete search history.

(56) References Cited

U.S. PATENT DOCUMENTS

| | | | |
|---|---|---|---|
| 9,521,373 B2* | 12/2016 | Lynch | ...................... H04N 7/18 |
| 2005/0275720 A1 | 12/2005 | Noguchi | |
| 2012/0037575 A1 | 2/2012 | Wen | |
| 2015/0102198 A1 | 4/2015 | Poliquin | |
| 2015/0309394 A1 | 10/2015 | Janze et al. | |
| 2016/0038815 A1* | 2/2016 | Snell | .................. A63B 21/0084 4/492 |
| 2018/0302572 A1* | 10/2018 | Barnes | ................. H04N 13/243 |

FOREIGN PATENT DOCUMENTS

| | | | |
|---|---|---|---|
| JP | H07135586 A | | 5/1995 |
| JP | H11159173 A | | 6/1999 |
| KR | 20100124640 A | * | 11/2010 |
| KR | 20100124640 A | | 11/2010 |
| WO | 2017184889 A1 | | 10/2017 |
| WO | 2019136325 A1 | | 7/2019 |

OTHER PUBLICATIONS

Written Opinion issued in International Application No. PCT/US19/049144 dated Nov. 2, 2019.

* cited by examiner

MULTI-CAMERA SYSTEM FOR MULTIDIMENSIONAL SWIMMING VIDEO CAPTURE

CROSS-REFERENCE TO RELATED APPLICATIONS

This application is a continuation-in-part of PCT International Patent Application No. PCT/US2019/049144, filed Aug. 30, 2019, which claims priority to U.S. Provisional Patent Application No. 62/726,409, filed Sep. 3, 2018. The contents of both of those applications are incorporated by reference in their entireties.

TECHNICAL FIELD

The invention relates to a multi-camera system for multidimensional motion capture, particularly for swimmers in motion from perspectives both above and below water.

BACKGROUND

Video recordings of athletes are used in many sports to improve athletic performance by allowing athletes and coaches to see, and thus analyze and improve, details of biomechanics and technique. In some cases, a particular movement occurs too quickly for the human eye to perceive and thus can only be captured and revealed by video recordings; in other cases, multiple cameras trained on an athlete can give the athlete or coach perspective that is not possible to obtain with the eye alone—especially from the pool deck or from a small number of underwater perspectives. For example, a particular motion may be the result of a chain or sequence of body movements, and only with multiple video recordings from different perspectives, moving in synch with the swimmer, is it possible to observe the entire sequence.

With many kinds of sports, it is possible to place multiple stationary cameras and achieve satisfactory results. However, swimming poses particular problems. Swimmers are underwater, a difficult environment for electronics of any sort, and are not readily accessible from all angles. Traditional approaches for taking video of swimmers include having a person run alongside the pool with a camera, running a camera track on one side of the pool or on the pool bottom, and placing stationary cameras around the pool. None of these approaches are entirely satisfactory: a track camera on the side of the pool offers only a side view of the swimmer, and depending on their positioning, stationary cameras may only provide relatively brief glimpses of a passing, approaching, or departing swimmer. Even if the camera perspective itself is useful, the operator may not be able to keep perfect or steady pace with the swimmer, thus negating the camera's effectiveness.

SUMMARY OF THE INVENTION

One aspect of the invention relates to a multi-camera system for multidimensional video capture that is particularly useful for recording the movements of swimmers. The system includes a self-propelled mobile frame that is of sufficient size to surround a swimmer laterally as well as above, below, ahead, and behind while he or she swims. The frame carries a number of equipment pods. Each equipment pod houses cameras, typically a pair of stereocameras, and may house additional sensors as well. Coordinated motor pods connect the frame to a pair of tracks, one of which is on each side of the frame, and propel the frame along the tracks. The frame may also support one or more booms that carry equipment pods with cameras and allow the system to capture video from additional angles. The frame also carries transmission hardware allowing the frame to communicate video and other data to external receivers and communication devices in real time or near real time. The transmission hardware, and other sensors and electronics, may reside either in dedicated pods or fairings, or in other parts of the system.

Other aspects, features, and advantages of the invention will be set forth in the following description.

BRIEF DESCRIPTION OF THE DRAWING FIGURES

DETAILED DESCRIPTION

Figure 1:
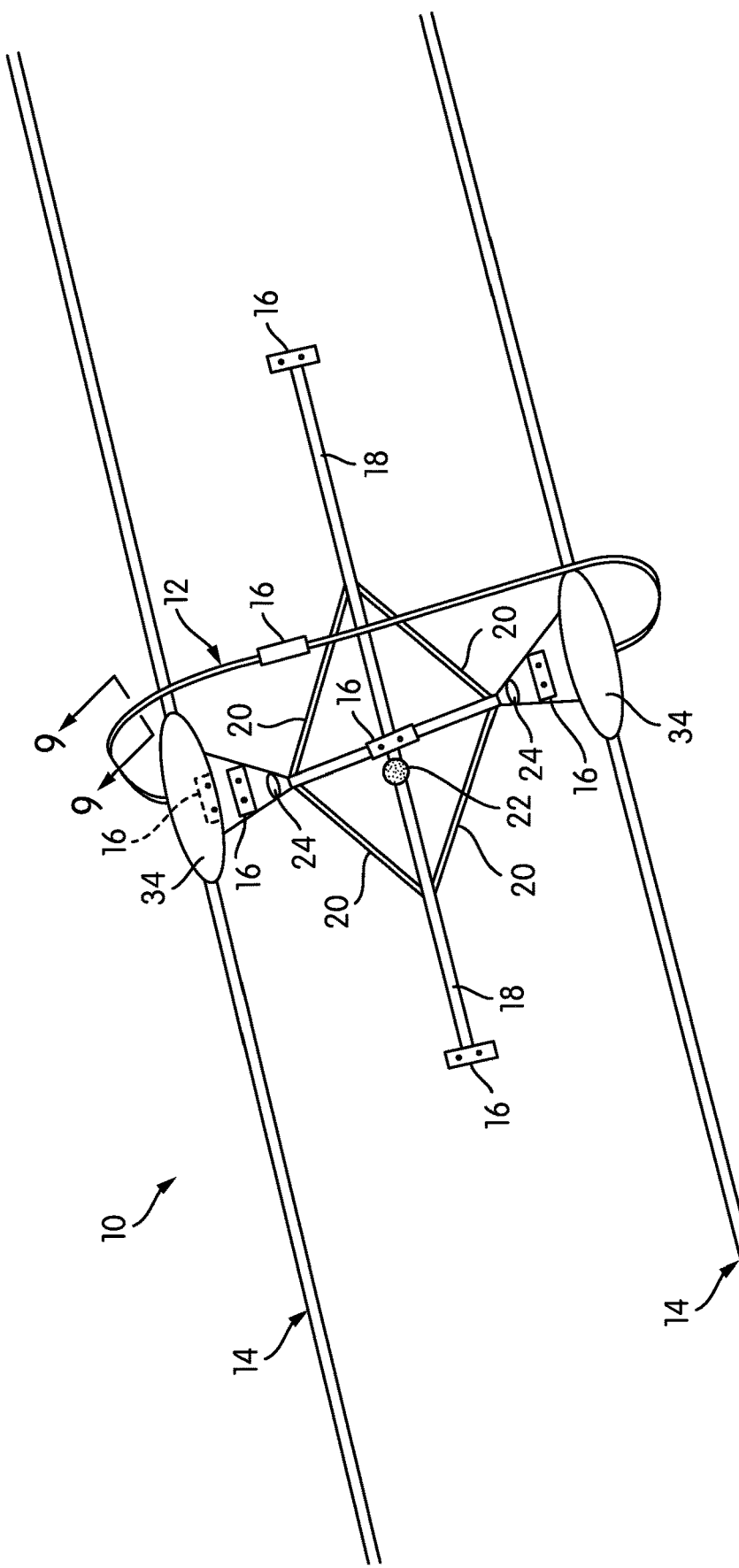
FIG. 1 is a perspective view of a multi-camera system for multidimensional video capture according to one embodiment of the invention.

FIG. 1 is a perspective view of a multi-camera system for multidimensional video capture, generally indicated at 10, according to one embodiment of the invention. System 10 includes a frame 12 mounted for self-propelled movement in a swimming pool along a pair of tracks 14.

Figure 2:
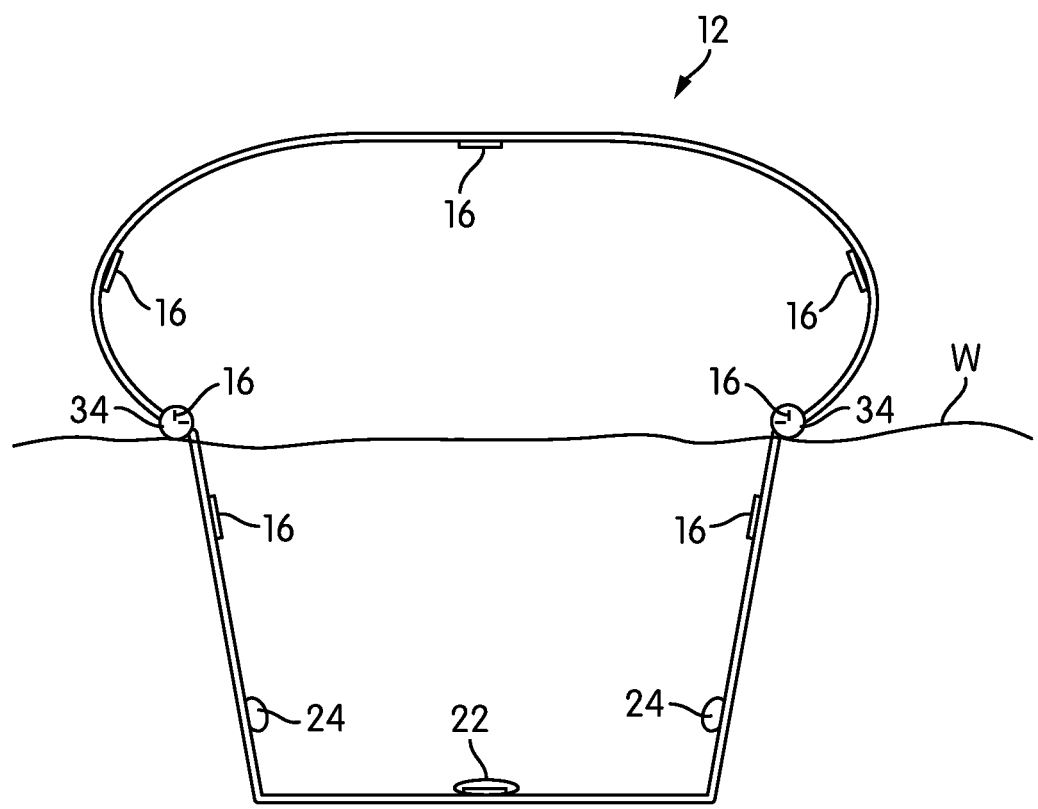
FIG. 2 is a front elevational view of the system of FIG. 1.

FIG. 2 is a front elevational view of the frame 12. As shown in FIGS. 1 and 2, the frame 12 is a thin member that is dimensioned to surround a swimmer laterally as well as above and below in a swimming pool. The frame 12 does not restrict the swimmer's motion along the lane of the swimming pool, nor does it trap the swimmer from exiting the frame. In the illustrated embodiment, the frame extends both above and below the water, and has a complex shape, polygonal below the waterline W and curved above it. However, the shape of the frame 12 may vary from embodiment to embodiment. The members of the frame 12 themselves would typically be hollow and may be double- or triple-butted for strength.

The frame 12 carries a variety of equipment for illuminating and taking video of a swimmer. A number of equipment pods 16 are carried along the inner perimeter of the frame 12, facing inwardly. As shown in FIGS. 1 and 2, one equipment pod 16 is positioned above the waterline W on center at the highest point of the frame 12, and a pair of equipment pods 16 are located above the waterline W to the left and right of center. A pair of equipment pods 16 are placed below the waterline W on the left and right sides of the frame 12. Additionally, the bottom of the frame 12 includes an equipment pod 16 positioned on center. The bottom of the frame 12 also supports fore and aft booms 18, which are further supported by four short support struts 20 that connect between the frame 12 and the booms 18, forming a shape approximating a parallelogram. (The terms "fore" and "aft" are used with respect to the coordinate system of the figures; the frame 12 itself can traverse the tracks 14 in either direction and is fore-aft symmetrical, such that either side may be fore and either side may be aft, depending on the direction of travel.) An equipment pod 16 is positioned at the end of each boom 18, making for a total of eight equipment pods 16 in the illustrated embodiment of the system 10. The equipment pods 16 at the ends of the booms 18 may be covered by hydrodynamic fairings in some embodiments. Additional equipment pods 16 may be added at different points along each boom 18 and along the frame 12 to add quality to volumetric video capture.

The equipment pods 16 are water-tight equipment enclosures that typically carry cameras. The cameras are trained on the interior of the frame 12, and transparent windows in the equipment pods 16 allow the cameras to focus and take video or, if desired, still images, while the swimmer swims. The cameras may be of any type or features, but it may be advantageous if each equipment pod contains a pair of stereocameras, as will be described in more detail below. The equipment pods 16 may be identical and contain identical cameras, or they may be different. It should be understood that while this description focuses on the use of equipment pods 16, some types of waterproof cameras may be used without any type of enclosure, although even if a camera can be immersed to the appropriate depth, an equipment pod 16 may still be useful for its hydrodynamic shape. If equipment pods 16 are used, they may be vacuum-sealed or have their empty space filled with dry nitrogen gas to prevent fogging.

The frame 12 may support additional equipment as well. At the bottom of the frame 12, a speaker pod 22 is mounted. The speaker pod 22 would allow a coach to provide real time verbal instructions to the swimmer. Near the bottom corners of the frame 12, which are likely to be farthest from light sources, a pair of lights 24 are mounted. The lights 24 may be, e.g. LED lights, and may be either omnidirectional or focused on a particular point, such as the center of the frame 12, where the swimmer is likely to be.

Figure 3:
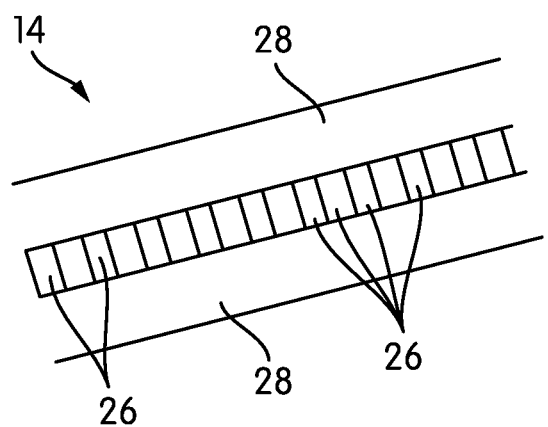
FIG. 3 is a top plan view of a section of track.
Figure 4:
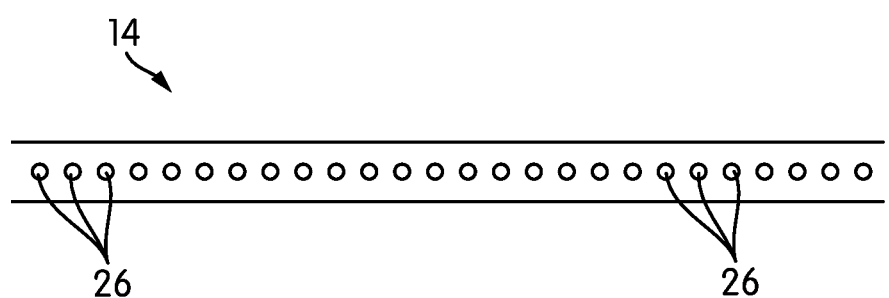
FIG. 4 is a side elevational view of the section of track of FIG. 3.

The tracks 14 that support the frame 12 in the pool run approximately at the waterline W, where traditional lane markers would be placed. FIG. 3 is a top plan view of a section of one of the tracks 14, and FIG. 4 is a side elevational view of a section of the tracks 14. Each of the tracks 14 is comprised of a series of short bars 26 spaced from one another at a defined pitch. The bars 26 extend horizontally when the track 14 is installed, with each side of each bar 26 terminating in a side portion 28. The side portions 28, in addition to securing and supporting the bars 26, have at least a portion adapted to provide buoyancy. For example, the side portions 28 may be made of a plastic foam for buoyancy, they may have air-filled cavities, or they may include any other features necessary or desirable for buoyancy. If the side portions 28 are made of a soft foam, they have the additional benefit of being safer for the swimmer. The tracks 14 may be comprised of articulated links that allow the tracks 14 to fold or roll. In some cases, the entirety of the tracks 14 may comprise articulated links, much like a bicycle chain; in other cases, each track 14 may have only a few articulated links that act as fold points for the track 14.

As will be described below in more detail, the bars 26 are adapted to engage sprockets or gears on the frame 12, and they may have any features that are necessary or desirable for that task. In the illustration of FIG. 4, the bars 26 are round in cross-section, but they may be square, rectangular, or any other shape in other embodiments.

Figure 5:
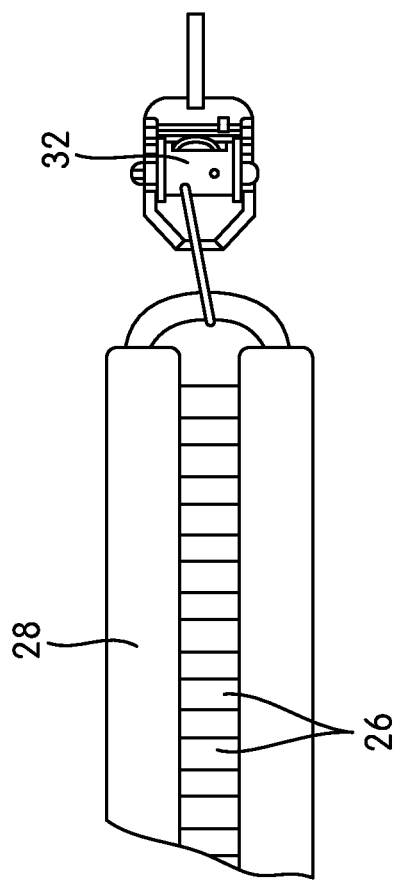
FIG. 5 is a top plan view of the track of FIG. 3, illustrating the end connections of the track.
Figure 5:
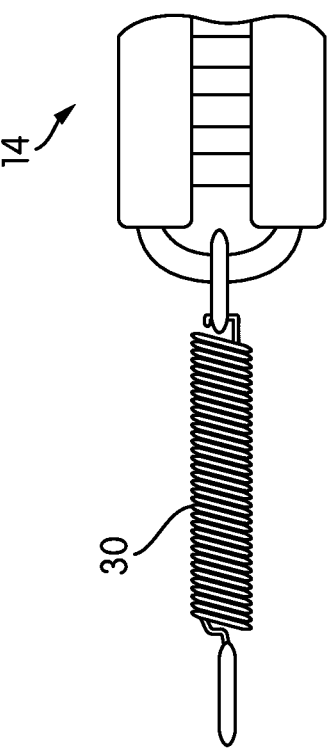
Figure 6:
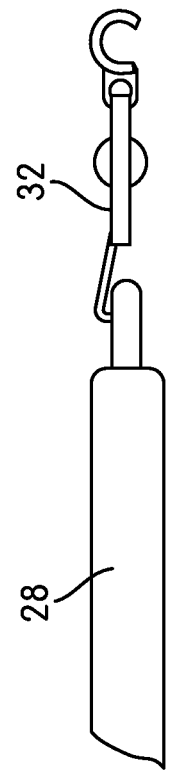
FIG. 6 is a side elevational view of the track of FIG. 5.
Figure 6:
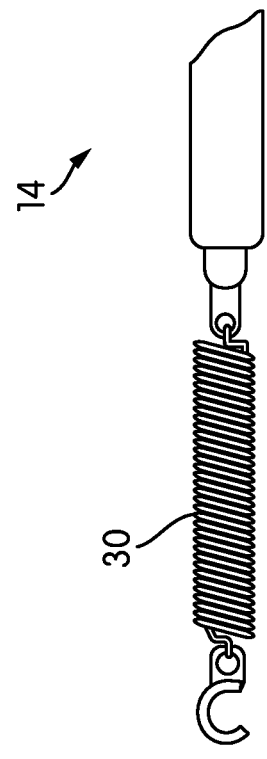

FIGS. 5 and 6 are top plan and side elevational views of the tracks 14, illustrating their ends and the way in which they would connect with anchors embedded in the ends of a swimming pool lane. As shown, one end of the tracks 14 connects with a hook-ended tension spring 30; the other end connects with a commercially-available tensioning ratchet 32. The precise connections between the tracks 14 and the pool may vary from embodiment to embodiment; in general, any connection hardware that will connect with the anchors that are embedded in a pool may be used. The tracks 14 may also be connected with dynamometers or other forms of tension gauges to check the tension in each track 14.

Figure 7:
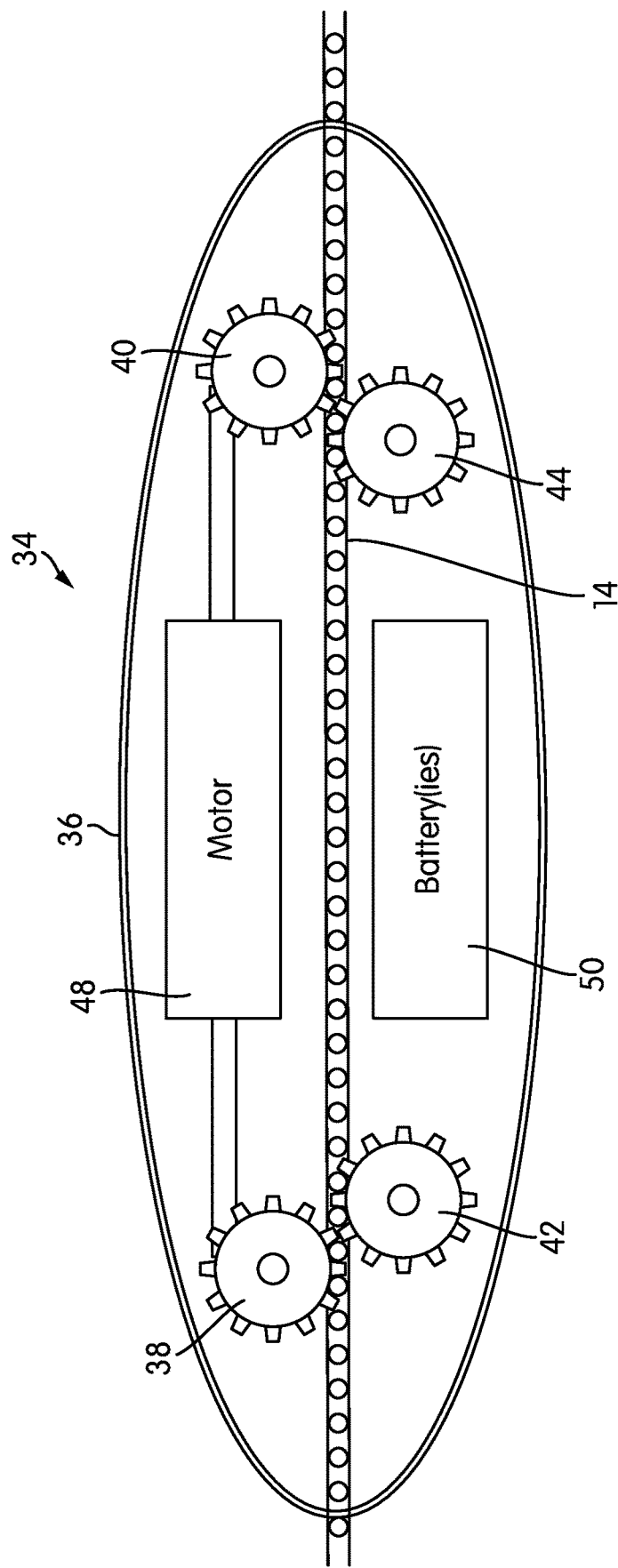
FIG. 7 is a schematic cross-sectional view of a propulsion pod.

The frame 12 attaches to the tracks via a pair of propulsion pods 34, one on each side of the frame 12. The propulsion pods 34 are best seen in FIG. 1; FIG. 7 is a schematic cross-sectional view of one of the propulsion pods 34. As shown in FIG. 7, each propulsion pod 34 has an ellipsoidal shell 36 that acts as a hydrodynamic fairing. Within the shell 36, there are sprockets or gears 38, 40, 42, 44 positioned to engage a track 14 from both above and below for stability. In the illustration of FIG. 7, the two gears 38, 40 above the track 14 are driven directly by a DC motor 46; the two gears 42, 44 below the track 14 are not driven and serve to guide and balance the propulsion pod 34 along the track 14. The batteries 50 that power the motor 48 are shown schematically in FIG. 7. The axles of the gears 38, 40, 42, 44 are supported by an internal framework that is not shown in FIG. 7. While the DC motor 48 is shown as directly driving the gears 38, 40 in FIG. 7, there may be a gearbox between the motor 48 and the gears 38, 40 in some embodiments. Battery charging may be provided either through a watertight charging port or by inductive charging through the shells 36 of the pods 34.

The tracks 14 enter fore and aft openings in the shell 36 that are not shown in FIG. 7. Thus, the interior of the propulsion pods 34, or at least a portion of the interior of the propulsion pods 34, is typically water-filled. For that reason, the motor 48 and batteries 50 would generally be sealed against water ingress. In some cases, the motor 48, the batteries 50, or both may have heat sink surfaces or fins that are exposed to the water. The propulsion pods 34 may include water intakes and outlets, typically protected by hydrodynamic grates or other such protective coverings. The grates serve to direct the water flow and also provide a measure of safety by preventing ingress of undesirable elements.

The propulsion pods 34 and gearing 38, 40, 42, 44 are arranged to provide the most possible stability for the frame 12. For that reason, the propulsion pods 34 themselves may be relatively long, e.g., at least about 1 foot, and much longer than 1 foot in many applications. The length may give them additional moment arm to counter hydrodynamic torques on the frame 12. Within the propulsion pods 34, the gears 38, 40, 42, 44 may be arranged in any number of ways above and below the tracks 14 to counter forces and torques.

First, as can be seen in FIG. 7, the upper gears 38, 40 are spaced from one another a distance. In the illustrated embodiment, the lower gears 42, 44 are spaced from one another a shorter distance than the upper gears 38, 40. In general, lower gears may be ahead of or behind the lower gears, and they may be spaced at the same distance as the upper gears 38, 40, a lesser distance, or a greater distance.

Figure 8:
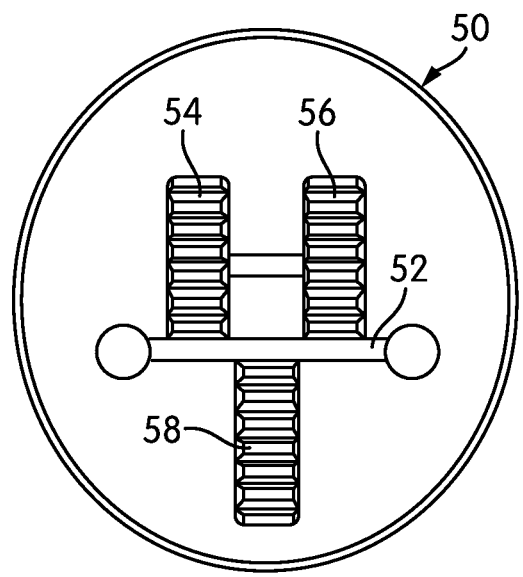
FIG. 8 is a schematic front cross-sectional view of a propulsion pod according to another embodiment of the invention.

In FIG. 7, four gears 38, 40, 42, 44 are shown, but there may be more or fewer gears in other embodiments. FIG. 8 is a schematic frontal cross-section of a propulsion pod 50 according to another embodiment of the invention. The propulsion pod 50 engages a track 52, which is relatively wide. There are two gears 54, 56 abreast atop the track 52 and a single gear 58 below the track 52. The gear 58 below the track 52 may lead, follow, or lie between the gears 54, 56 above the track 52.

Thus, in this embodiment, the track 14 and the gears 38, 40, 42, 44 are a form of chain and sprocket. However, other arrangements are possible. In other embodiments, the track could simply be a flat bearing surface, and the gears could simply be wheels, potentially equipped with a high-friction rim or tire, that either bear on or clamp onto the track. The term "gear" should be construed to include such wheels and other rolling engaging elements.

In other embodiments, if the hydrodynamic moments on the frame 12 are expected to be particularly large, a second or third set of pods may be rigidly attached to the propulsion pods 34, 50 e.g., by a rigid tube or boom. The second, out-rigged set of pods would typically engage the tracks 14 with passive gears or sprockets, serving to counterbalance forces and moments caused by the travel of the frame 12 through the water. The second set of pods may be detachable, so that they can be used only when needed.

The above description assumes that both propulsion pods 34, 50 in a set are powered. While two propulsion pods 34, 50 are used for stability, only one propulsion pod 34, 50 in a set need be powered in order to move the frame 12.

The arrangement shown with the propulsion pods 34, 50 is but one way in which the frame 12 may be propelled. Other methods of propulsion may be used. For example, the frame 12 may be propelled by a motor-driven pulley and cable system that is mounted at one or both ends of the pool. However, having the propulsion mechanism mounted on the frame 12 or in association with it may simplify the overall process of installing system 10.

Each propulsion pod 34, 50 may also include antennas for communicating data to an external station, such as a coach's station. Data from the cameras in the equipment pods would typically be transmitted via an array of antennas via a communication protocol such as WiFi (i.e., IEEE 802.11n/ac or a similar protocol). The antennas would typically be above water to avoid issues with radio frequency transmission through water, either in the upper portion of the propulsion pod 34 or within the upper portion of the frame 12. Various means may be used to increase bandwidth, including large arrays of antennas and directional beamforming, to give but a few examples.

Figure 9:
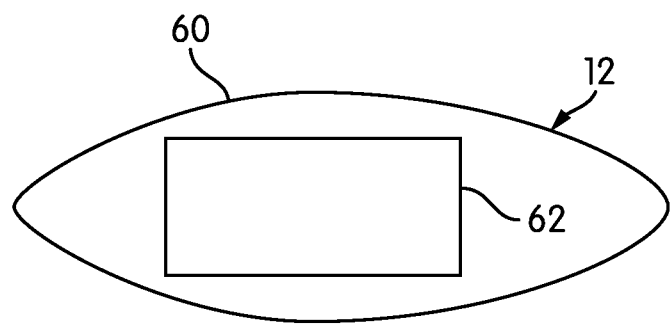
FIG. 9 is a cross-sectional view of a frame, taken through Line 9-9 of FIG. 1.

FIG. 9 is a cross-sectional view of the frame 12 taken through Line 9-9 of FIG. 1. As shown, the outer shell 60 has a hydrodynamic shape. Within the outer shell 60 of the frame 12, a raceway 62 is provided for cabling to run between equipment pods 16, 22. Antenna arrays and transmission hardware may also be positioned within the raceway 62. If the raceway 62 is made of a material that is not transparent to the frequencies used to transmit information, the outer shell 60 of the frame 12 may be transparent to such frequencies, and the transmission antennas may be located in the interstitial space between the raceway 62 and the outer shell 60.

The frame 12 may have other features as well. For example, portions of the frame 12 may be equipped to telescope in order to alter its size. Additionally, portions of the frame 12 may be hinged to allow it to collapse. Thus, the frame 12 may be easily removed and stored, and in most cases, there will be no need to install system 10 permanently in a lane of a swimming pool, although in some cases, it may be installed permanently. The width of the frame 12 in any particular installation would be determined by the spacing of the tracks 14 which, in turn, is determined by the distance between the pool's lane markers.

Typically, in order to install system 10 in a swimming pool, the tracks 14 would be connected to anchors on one side of the pool and their free ends fed through openings in the propulsion pods 34 and engaged with the gears 38, 40, 42, 44 before being connected to anchors on the opposite end of the swimming pool. As was described briefly above, ratcheting systems and dynamometers or other kinds of tension gauges can be used to set appropriate tension in the tracks 14. In operation, the tracks 14 would typically be at water level, while at least portions of the propulsion pods 34 would be underwater. In the rare case in which the pool's anchors are not placed at water level, an adjustable attachment may be secured to each of the anchors and set to meet the ends of the tracks 14 at water level.

In operation, the frame 12 is propelled at a velocity that keeps pace with the swimmer. The velocity of the frame 12 in operation can be controlled in any number of ways. For example, the frame 12 itself may have sensors, e.g., ultrasonic sensors, that allow it to detect and pace the swimmer. System 10 may use vision processing software and machine vision techniques, such as blob analysis, to determine swimmer position from image data generated by its cameras.

Alternatively, the position and velocity of the swimmer may be measured by an external base station positioned either in the swimming pool or around it, and commands may be sent to the frame 12 to speed up or slow down based on this externally-generated data. For example, International Patent Application Publication No. WO2019/136325, which is incorporated by reference in its entirety, describes apparatus and methods for combining optical rangefinding techniques with machine vision and computing to determine the position and velocity of swimmers. Those techniques may be used here, and the underwater device disclosed in that publication may directly send the frame 12 commands to speed up or slow down based on the measured velocity of the swimmer.

Ultrasonic rangefinding from one end of the pool, above or below the surface of the water, may also be used. In addition, a laser rangefinder mounted above the water on the frame 12, aimed parallel with the tracks 34 and reflecting off of a plate mounted at one end of the pool, may be used to determine the position of the frame 12 in the lane, and that data may be used to avoid accidental collisions with the end of the pool. That data, combined with timing of laser rangefinder samples, may provide accurate positional information for the frame 12. These techniques for determining the position of the frame 12 would be used in conjunction with swimmer position data to determine the velocity of the frame 12. For example, the optical or ultrasonic methods described above may be used for this purpose. All of the quantitative methods for frame speed adjustment may include time series methods, such as moving averages to maintain smooth transitions in speed adjustment.

Of course, in the simplest embodiments, a coach at a fixed or mobile external station may have a control to adjust the velocity of the frame 12 manually based on received image data from the cameras on the frame 12, or simply based on direct observation.

System 10 may provide data in a number of ways. In some embodiments, the data stream from the frame 12 in system 10 may be comprised of multiple channels of two-dimensional video. In other embodiments, if stereocameras are used, system 10 may construct three-dimensional views of the swimmer in motion. Depending on bandwidth and computing power available, a three-dimensional or holographic view of the swimmer may be constructed in real time or in near-real time. With enough data, a volumetric display could be constructed. Display data may be computed using computing devices mounted on or in the frame 12, or it may be computed on an external workstation or workstations, such as a coach's station, either in real time or as a post-processing operation. Of course, even if the frame 12 is equipped to provide three-dimensional data, the swimmer or coach may choose to provide only two-dimensional data.

System 10 may cooperate with other types of biomechanical information systems, and may have other types of sensors for that purpose. For example, biomechanical markers may be applied to the swimmer at selected points, joints for example, for precise biomechanical analysis of two- and three-dimensional video data.

Figure 10:
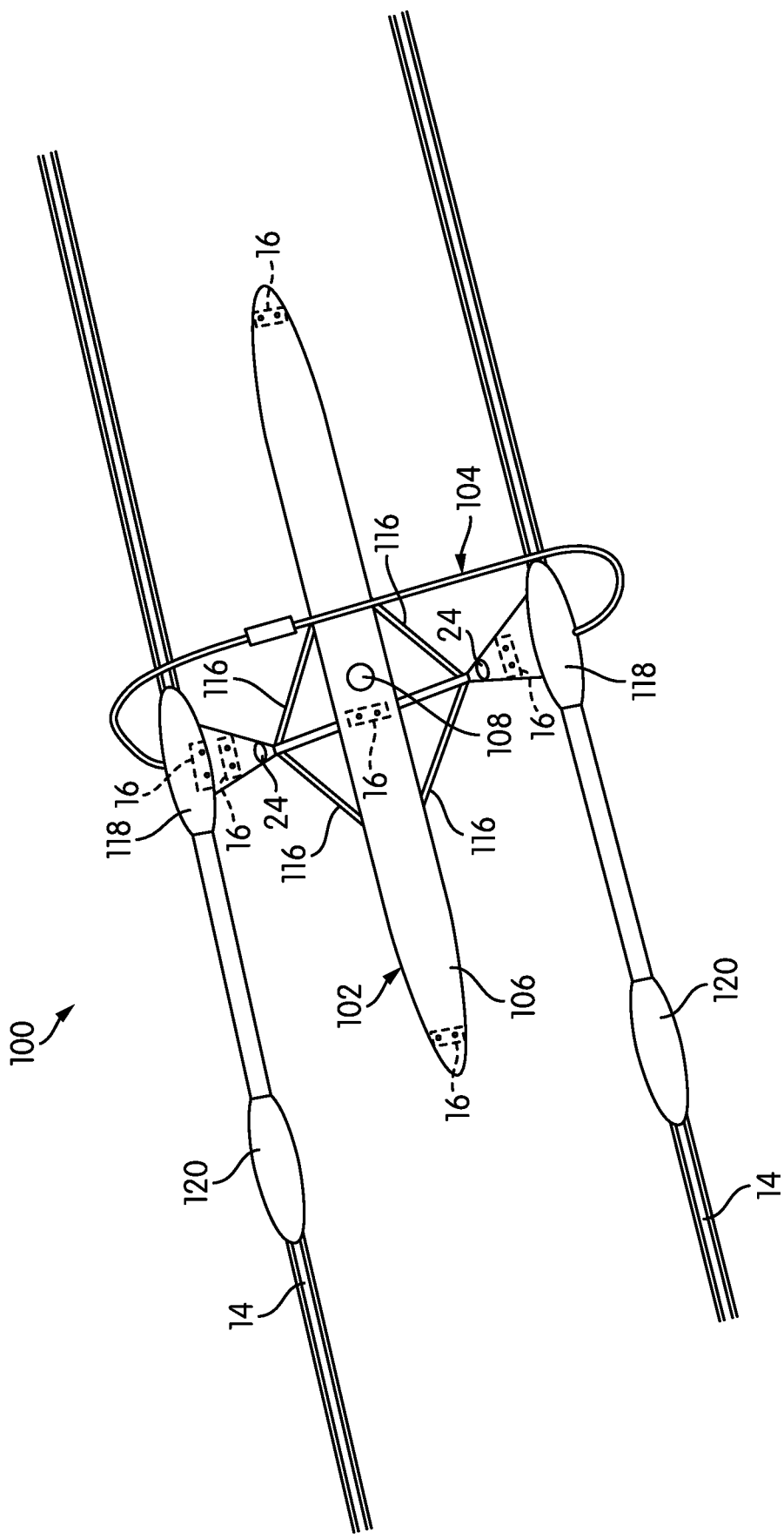
FIG. 10 is a perspective view of a multi-camera system for multidimensional video capture according to another embodiment of the invention.

FIG. 10 is a perspective view of a system, generally indicated at 100, according to another embodiment of the invention. System 100 of FIG. 10 is substantially similar to system 10 of FIG. 1; therefore, features not specifically described here may be assumed to be similar to, or the same as, those of system 10.

In system 100, the main longitudinal strut 102 of the frame 104 is encased within a hydrodynamic fairing 106. The hydrodynamic fairing 106 may be structural, e.g., a monocoque. The fairing 106 may also be covered in foam, rubber, or another such soft material for safety, in case the swimmer accidentally collides with it. As shown, a speaker 108 is mounted within the fairing 106. In some cases, a screen may be mounted horizontally on the fairing 106 facing upward, so as to display information to the swimmer. That information may be speed, acceleration, lap count or elapsed time, statistically-derived indices of stroke mechanics, or it may be instructions from a coach that are transmitted from a coaching station for display on the screen. In some cases, the display may show one or more views gathered from the cameras mounted on the frame 104, while in other cases, the swimmer or a coach may select a combination of things to display, including speed, acceleration, lap count or elapsed time in any combination of text, audio, or video, either before swimming begins or in real time during the session. Messages may also be automated, triggered, for example, by the position of the frame 104 in the swimming pool.

FIG. 10 also illustrates a variation in the manner in which the frame 104 engages the tracks 14. Specifically, the frame 104 has both propulsion pods 118 and a set of outrigger pods 120 that are rigidly connected to the propulsion pods 118 and are spaced some distance from the frame 104. The outrigger pods 120 serve to counterbalance hydrodynamic forces and torques on the frame 104 as it travels through the water.

Figure 11:
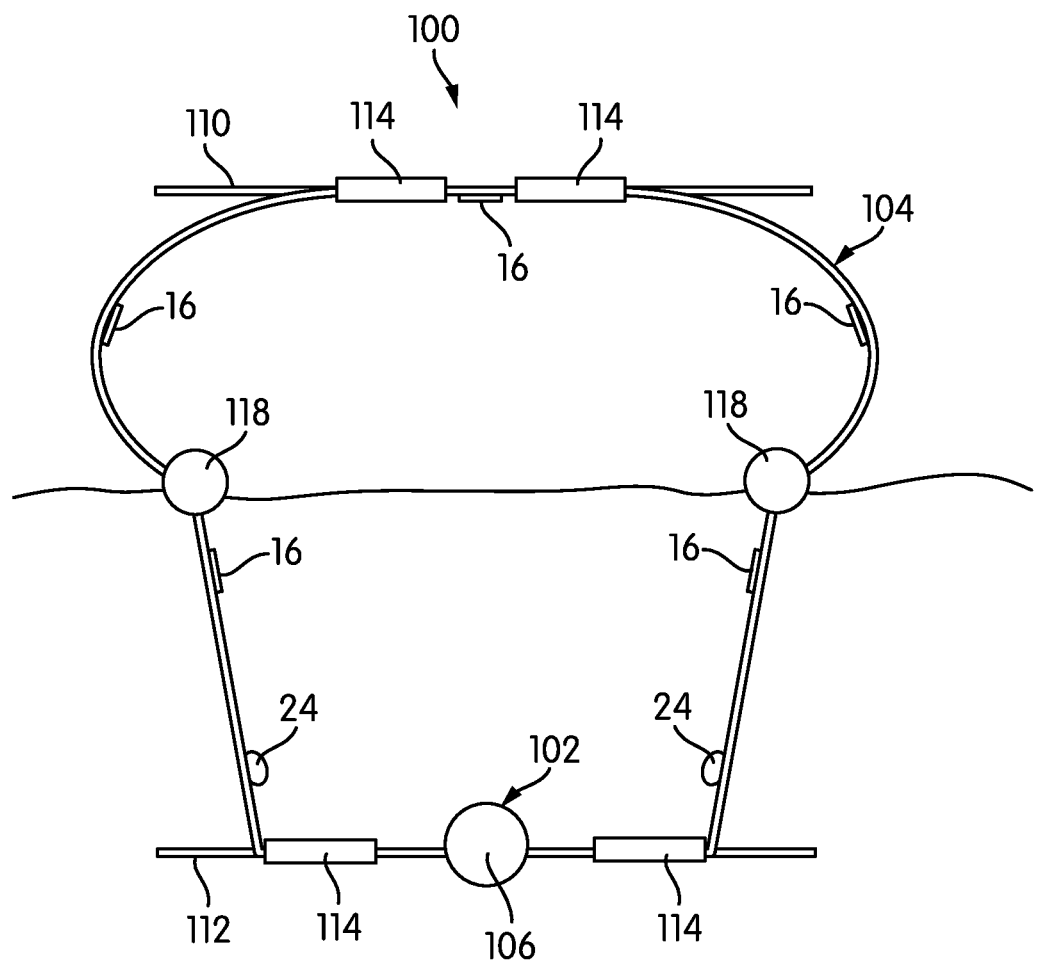
FIG. 11 is a front elevational view of the multi-camera system of FIG. 10.
Figure 12:
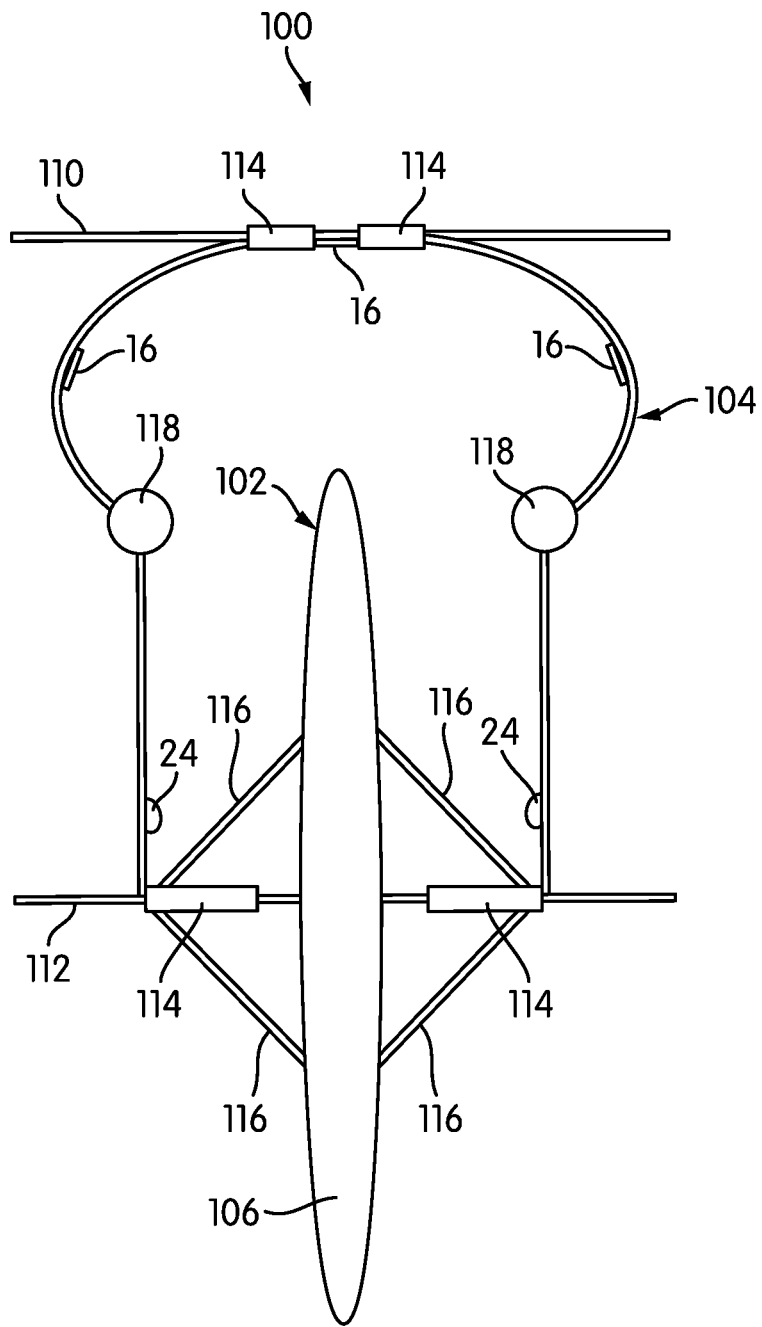
FIG. 12 is a front elevational view of the multi-camera system of FIG. 10 in a collapsed configuration.

As was described briefly above, the frame 12, 104 of a system 10, 100 may adjust in size to accommodate different lane widths and swimmer sizes. The frame 12, 104 may also collapse. FIGS. 11 and 12 are front elevational views of the frame 104 in operational and collapsed positions, respectively.

As shown in FIGS. 11 and 12, the frame 104 has expansion bars 110, 112 at the top and the bottom, providing room for the frame 104 to expand. In some embodiments, telescoping portions may be provided internal to the frame 104, but the expansion bars 110, 112 may provide for sturdier and more stable expansion. Two gripping clamps 114 hold the fixed portions of the frame 104 in place relative to the expansion bars 110, 112. The gripping clamps 114 may have studs that insert or screw into receptacles placed in defined positions, such that the frame 104 as a whole can assume any of a number of defined widths to match the locations of the tracks 14 and the location of the lane line anchors in the swimming pool.

FIG. 12 illustrates the frame 104 in a collapsed position. In this position, the frame 104 is set to a minimum width. Additionally, the longitudinal strut 106 and its support struts 116 of this embodiment are mounted to the frame 104 via rotating joints. These joints may allow for a range of different positions, but as shown in FIGS. 11 and 12, the rotating joints need only allow for two positions: the deployed position of FIG. 11 and the storage position illustrated in FIG. 12, in which the longitudinal strut 102 and its support struts 116 are rotated 90° with respect to the position of FIG. 11, such that they are in-plane with the rest of the frame 104. This allows the frame 104 to be stored in a vertical or horizontal case that is more compact than the deployed frame 104. The rotating joints would typically allow rotation without interrupting any electrical signals that transit the area. This may involve using rotating conductive joints made with, e.g., liquid metal or rotating mechanical plates. The ability of the frame 104 to collapse means that the frame 104 need not be installed permanently. When the frame 104 is collapsed, the outrigger pods 120 may be detached. Additionally, the expansion bars 110, 112 themselves may be made in two or more pieces each that are telescoping and/or screwed together at installation, in order to provide for greater convenience in collapsing the frame 104. In other embodiments, the lateral halves of the frame 104 may optionally be separated for storage.

If the frame 104 is stored in a storage case, the storage case may act as a charging station. Battery charging may be provided either through a watertight charging port or by inductive charging through the shells 36 of the pods 34.

While the invention has been described with respect to specific embodiments, the embodiments are intended to be exemplary, rather than limiting. Modifications and changes may be made within the scope of the invention, which is defined by the appended claims.

What is claimed is:

1. A system, comprising:
    a pair of tracks, each of the pair of tracks having opposite ends, spaced from one another, wherein each opposite end is attached to an anchor on opposite walls of a swimming pool; and
    a frame having a perimeter, the frame being adapted to engage and travel along the pair of tracks and having
        a pair of propulsion pods adapted to engage the pair of tracks to drive the frame along the pair of tracks,
        a plurality of equipment pods carried by and spaced along the frame, at least some of the plurality of equipment pods carrying one or more cameras focused into the perimeter of the frame, the one or more cameras adapted to simultaneously image a swimmer within the frame, and
        communication hardware to communicate data from the equipment pods to an external station.

2. The system of claim 1, wherein the plurality of equipment pods comprise:
    a top equipment pod mounted on a top portion of the frame, the top equipment pod having one or more top cameras focused down;

a first lower side equipment pod mounted on a first lower side portion of the frame, the first lower side equipment pod having one or more first lower side cameras focused in;

a second lower side equipment pod mounted on a second lower side portion of the frame opposite the first lower side portion, the second lower side equipment pod having one or more second lower side cameras focused in; and a bottom equipment pod mounted on a bottom portion of the frame, the bottom equipment pod having one or more bottom cameras focused up.

3. The system of claim 2, wherein the plurality of equipment pods further comprise:

a first upper side equipment pod mounted on a first upper side portion of the frame between the top equipment pod and the first lower side equipment pod, the first upper side equipment pod having one or more first upper side cameras focused down and in; and a second upper side equipment pod mounted on a second upper side portion of the frame between the top equipment pod and the second lower side equipment pod, the second upper side equipment pod having one or more second upper side cameras focused down and in.

4. The system of claim 2, wherein the frame further comprises fore-aft extending booms, each of the booms having at least one of the equipment pods, each of the equipment pods carrying one or more of the cameras.

5. The system of claim 1, wherein the frame further comprises one or more lights focused into the perimeter of the frame.

6. The system of claim 1, wherein the frame further comprises a speaker, and the communication hardware is further configured to communicate audio data to the speaker.

7. The system of claim 6, wherein the speaker is mounted on a bottom portion of the frame, such that sound is directed upward.

8. The system of claim 1, wherein the frame further comprises a display, and the communication hardware is further configured to communicate data to the display.

9. The system of claim 1, wherein at least one propulsion pod comprises:

a motor;

a battery powering the motor; and two or more gears driven by the motor.

10. The system of claim 9, wherein the two or more gears are distributed above and below each of the pair of tracks.

11. The system of claim 9, wherein the two or more gears with at least some of the gears are abreast of one another.

12. The system of claim 1, further comprising a set of outrigger pods rigidly connected to the pair of propulsion pods, the set of outrigger pods being adapted to engage the pair of tracks.

13. The system of claim 1, wherein the external station provides speed or positional control data to the frame through the communication hardware.

14. The system of claim 1, wherein the system further comprises a sensor station adapted to provide speed or positional control data to the frame through the communication hardware.

15. The system of claim 14, wherein the sensor station detects one or both of the position or velocity of the swimmer.

16. The system of claim 1, wherein the system is adapted to produce or provide a three-dimensional or holographic view of the swimmer based on the data from the plurality of equipment pods.

17. The system of claim 1, wherein each of the pair of tracks comprises articulated links.

18. The system of claim 17, wherein the articulated links act as fold points for the track.

19. The system of claim 1, wherein each of the pair of tracks comprises buoyant structure.

20. The system of claim 1, wherein the opposite ends of each of the pair of tracks are adapted to attach to the anchors on the opposite walls of the swimming pool using a hook-ended tension spring or a tensioning ratchet.

21. The system of claim 1, wherein the pair of tracks are further adapted to serve as lane marker replacements.

* * * * *